MULTILEVEL PARTIAL-RESPONSE DATA TRANSMISSION

Filed May 19, 1967 6 Sheets-Sheet 1

INVENTORS A. M. GERRISH
R. D. HOWSON
BY J. P. Kearns
ATTORNEY

MULTILEVEL PARTIAL-RESPONSE DATA TRANSMISSION

Filed May 19, 1967

Jan. 27, 1970 A. M. GERRISH ET AL 3,492,578

MULTILEVEL PARTIAL-RESPONSE DATA TRANSMISSION

Filed May 19, 1967 6 Sheets-Sheet 4

Jan. 27, 1970 A. M. GERRISH ET AL 3,492,578

MULTILEVEL PARTIAL-RESPONSE DATA TRANSMISSION

Filed May 19, 1967 6 Sheets-Sheet 5

Jan. 27, 1970 A. M. GERRISH ET AL 3,492,578

MULTILEVEL PARTIAL-RESPONSE DATA TRANSMISSION

Filed May 19, 1967 6 Sheets-Sheet 6

United States Patent Office 3,492,578
Patented Jan. 27, 1970

3,492,578
MULTILEVEL PARTIAL-RESPONSE DATA TRANSMISSION

Allan M. Gerrish, Little Silver, and Robert D. Howson, River Plaza, N.J., assignors to Bell Telephone Laboratories, Incorporated, Murray Hill and Berkeley Heights, N.J., a corporation of New York Filed May 19, 1967, Ser. No. 639,870
Int. Cl. H04b *1/10*
U.S. Cl. 325—42 8 Claims

ABSTRACT OF THE DISCLOSURE

Multilevel digital data signals with an arbitrary number of levels M transmitted through partial-response channels of bandwidth W, i.e., through band-limited channels which disperse the response to individual data impulses over more than one signaling interval, increase the channel capacity to achieve transmission speeds of 2 $\log_2$ M bits per cycle of bandwidth. Precoding and decoding operations matched to the channel impulse response cause the received signals at sampling instants spaced at 1/(2W) intervals to be independent of samples taken at other sampling instants and thus eliminate error propagation.

BACKGROUND OF THE INVENTION

Field of the invention

This invention relates to high-speed transmission of digital data over transmission channels of limited bandwidth. Specifically, multilevel digital data signals are transmitted through baseband channels whose impulse response spectra are specially shaped to force multiple responses to symbol impulses of discrete amplitudes. Responses to individual successive impulses are thus forced into overlapping relationship, but in a controlled and structured fashion. Input multilevel symbols can normally be recovered by linear processing, i.e., addition and subtraction, of the successive received symbols. However, by precoding the input symbols according to this invention, the original message symbols can be recovered from single independent received samples, thus avoiding the error propagation potential of symbols which are not precoded.

Description of the prior art

In the copending United States patent application of E. R. Kretzmer, Ser. No. 441,197, filed Mar. 19, 1965 (now U.S. Patent No. 3,388,330, issued June 11, 1968). and entitled "Partial Response Data System" the concept of signal channel shaping to produce controlled correlation between received signal samples is introduced. The signal shaping can produce desirable effects such as efficient use of available bandwidth and elimination of direct-current components. As a consequence, the response to binary digital data symbols is forced to extend over more than one symbol interval. Each received signal sample then includes superposed contributions in a known structured pattern from more than one input symbol and may occupy one of several discrete levels. Because the resultant multiple levels are predictable in terms of particular sequences of input binary symbols, it is possible to precode the input signal sequences before application to the specially shaped channel so that the original data sequence is recoverable from single samples of the received wave at the normal signaling rate.

In accordance with the partial-response concept, the impulse response of a channel is spectrally shaped so that each binary symbol evokes a response extending over more than one signalling interval. The received symbol can then occupy a number of discrete levels determined by the number of signaling intervals over which the channel impulse response extends and also by the character of the weighting imparted to each of the multiple responses. For example, if the channel is so shaped that each binary symbol evokes two equally weighted responses of the same polarity extending over two signaling intervals, a superposition of successive responses at the binary signalling interval results in a three-level channel signal whose amplitude-frequency response is maximum at zero frequency and zero at a cutoff frequency numerically equal to half the signaling rate. Subject to a small noise penalty, spectral shaping under the partial-response concept permits effective signaling to the maximum theoretical rate of two bits per cycle of bandwidth for binary inputs.

Several classes of superposition are described by Kretzmer. Two classes have proved to be of particular practical interest—Class I: equally weighted symmetrical responses (as just described); and Class IV: equally weighted asymmetrical responses.

SUMMARY OF THE INVENTION

According to this invention, the partial-response concept is extended to the excitation of spectrally shaped, band-limited baseband transmission channels by multilevel input symbols. In the general case, each input data symbol, having one of M, where M is greater than two, discrete levels applied to a channel at least W cycles wide at intervals $T=1/2W$ second, evokes a time-domain response having nonzero components at $n$ sampling instants. For a sequence of such data symbols transmitted at intervals T seconds apart, each sample includes response components from $n$ symbols and can occupy more than the M transmitted levels. An individual data symbol can be recovered from the channel output by analog subtraction of the contributions made by $n$-1 previous symbols. In order to do this $n$ successive samples must be stored at the receiver and an algorithm for the subtraction devised. Since the correct interpretation of a given sample depends on the correct interpretation of $n$-1 preceding samples, errors can be propagated over many sampling intervals.

The problem of error propagation can be overcome by precoding the input data at the transmitter. Conceptually, a precoder has a characteristic which is the inverse of the impulse response of the channel. The precoder generates a summation of the contributions from $n$ successive past input symbols and subtracts them from the present input symbol. The precoded stream, in passing through the channel has these same contributions restored and each received sample is then related to only one message symbol.

Unfortunately, the only restriction on the transmitted symbols implied by such a precoder is that it produce the desired relation between message symbols and signal samples. Since this relation can be produced by transmitted symbols of very large amplitude, further restrictions must be imposed.

The transmitted symbols are limited to M possible levels by interpreting the precoding algorithm in a modulo—M sense. If the received sample is also interpreted in a modulo—M sense, the message digits can be recovered without error propagation.

As a practical matter it is inconvenient to measure the impulse response characteristics of many different channels. Therefore, channel filters are constructed to tailor a range of channels to a desired impulse response characteristic as described in the aforesaid Kretzmer application.

Inasmuch as most digital data to be transmitted originate in the binary format and techniques for handling binary data are fairly well developed, it has been found advantageous to carry out the precoding operation by logical manipulation of the original binary data prior to multilevel conversion. Similarly, the binary output of the receiver can be obtained by logical operations with slice and fold circuits. A sender or a receiver of binary signals need never be aware of the multilevel conversion during actual transmission.

According to one embodiment of the invention a serial binary signal is converted to a paired-bit parallel signal, encoded in the Gray cyclic code format to ensure that an error in detection affects only one bit of a multibit symbol, precoded to match a channel with Class I partial-response spectral shaping and finally translated into a four-level analog format. The transmission channel further converts the four-level precoded signal into a seven-level channel signal. The seven-level signal is congruent modulo-four with the paired-bit conversion of the original binary train and is detected by conventional techniques.

According to another specific embodiment of the invention, the same operations are performed on a binary input signal as in the just-mentioned embodiment, except that the precoding matches the transmitted signal to the Class IV partial-response spectral shaping.

DESCRIPTION OF THE DRAWING

The several features and advantages of this invention which combine multilevel transmission and partial-response channel-shaping will be more fully appreciated by a consideration of the following detailed description and the drawing in which.

DETAILED DESCRIPTION

Figure 1:
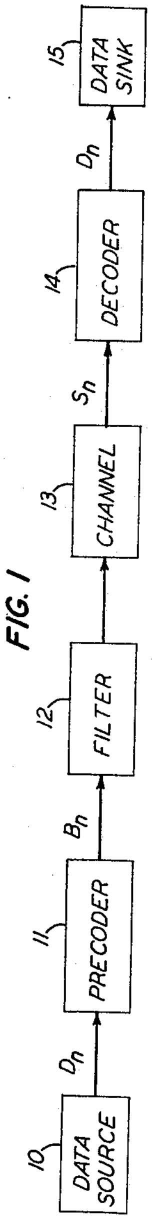
FIG. 1 is a generalized block diagram of a partial-response transmission system.

FIG. 1 is a generalized block diagram of a partial-response data transmission system including a precoder. Data source 10 is perfectly general and may emit data intelligence signals in binary form with marking bits called "1's" and spacing bits called "0's" or in multilevel form in which each level encodes binary bits in groups of two or more. For example, a four-level signal encodes the bit-pairs 00, 01, 10, and 11 on its respective levels. In general, an M-level signal contains $\log_2 M$ bits per level. By means of multilevel encoding more than one bit can be transmitted per symbol. The maximum number of symbols per cycle of bandwidth is limited by Nyquist's rule, i.e., no more than two symbols per cycle of bandwidth can be accommodated without undue intersymbol interference, even in a physically unrealizable ideal channel with zero frequency rolloff. However, an effective binary signaling rate of two bits per cycle of bandwidth can be obtained by conventional multilevel encoding. Thus, a four-level line signal, transmitted at the same power level as the binary signal, through a practical channel with 100 percent rolloff achieves a signaling rate of two bits per cycle of bandwidth with a noise penalty of about 3.9 decibels relative to a two-level system operating with an ideal, but unrealizable, zero rolloff channel. With practical partial-response shaping according to this invention a four-level input signal can be transmitted at an effective binary signaling rate of four bits per cycle of bandwidth with only 2.1 decibels of noise disadvantage over a conventional four-level signal transmitted over an unrealizable zero rolloff channel. This is 2.4 decibels better than conventional eight-level signaling over a 50 percent rolloff channel.

The output of data source 10 may be either a two-level or multilevel signal. Precoding according to the channel impulse response takes place in precoder 11. Its output $B_n$ is spectrally shaped in filter 12, whose response in combination with that of channel 13, effects a superposition of precoded components to a still larger number of levels. Filter 12 may advantageously be split in accordance with conventional practice between the transmitting and receiving ends of channel 13, if desired. The channel output $S_n$, having $(2M-1)$ levels, is the modulo-M equivalent of precoded input $B_n$. Decoder 14 comprises conventional multilevel slicing circuits for operation on the signal $S_n$. Because of the precoding at the transmitter no memory circuits are required in decoder 14. Data sink 15 accepts the decoded output $D_n$ from decoder 14 and operates on it in a conventional manner.

Figure 2:
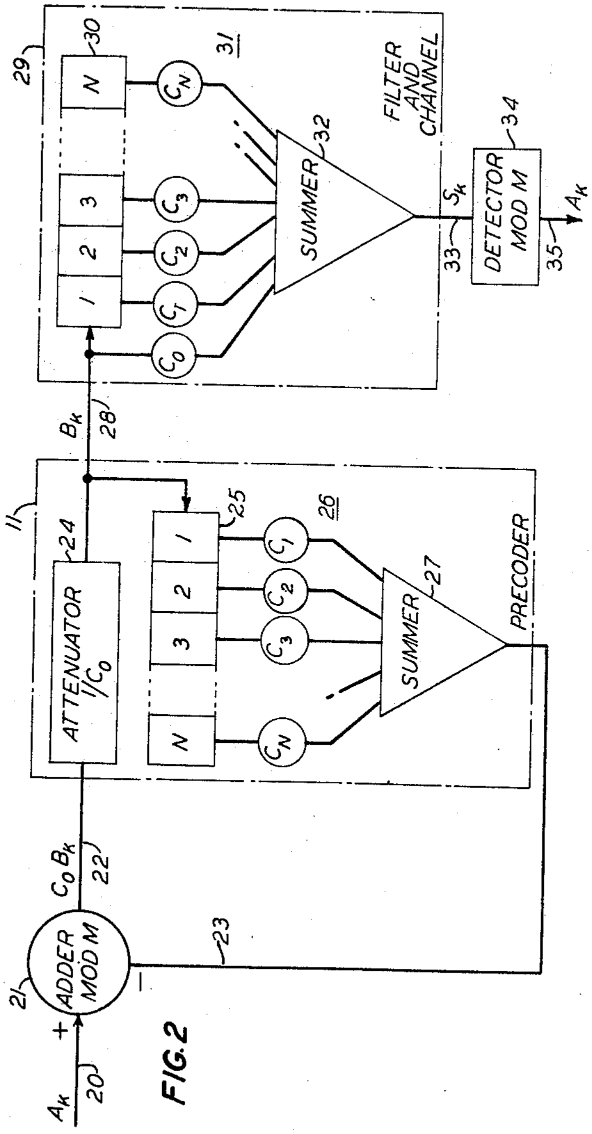
FIG. 2 is a digital representation of the general precoding principle of this invention.

FIG. 2 is a block diagram illustrating the general precoding principle. Broken line box 29 represents digitally the combined characteristic of transmission channel 13 and filter 12 of FIG. 1. It may also indicate simply the channel characteristic without special spectral shaping. Basically, the channel plus filter combination acts like a multitap delay line 30 whose input and delay components after progression from left to right are multiplied in units 31 by the indicated factor ($C_0, C_1 \ldots C_N$) and are then combined in a summer 32.

Figure 3:
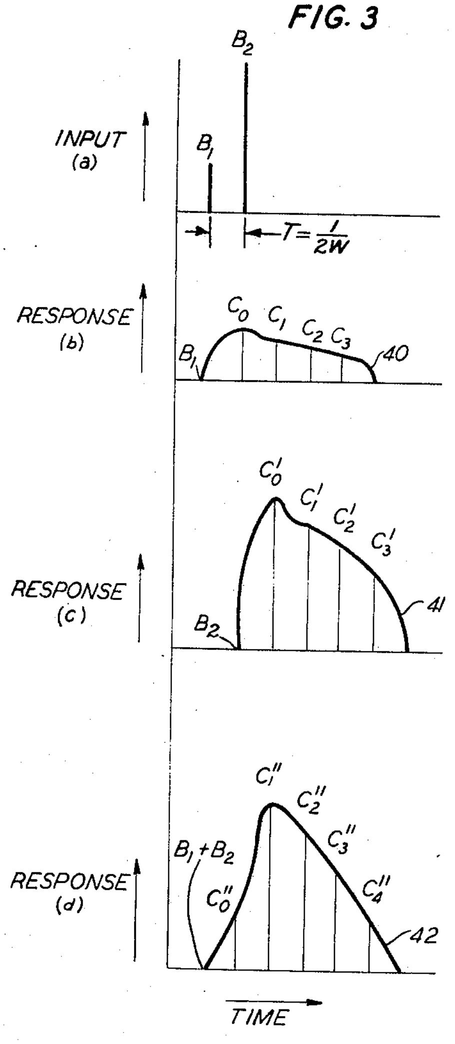
FIG. 3 is a waveform diagram showing the development of a superposed impulse response of a partial-response transmission channel to typical multilevel input signals.

Turn now briefly to FIG. 3 which indicates the generalized impulse response of a channel to representative multilever impulses $B_1$ and $B_2$ on line ($a$). Inputs are applied to the channel with bandwidth at least W cycles per second at intervals of $T=1/2W$. Input $B_1$, having an assumed unity amplitude, evokes the response 40 shown on line ($b$). At the $n$T sampling instants shown it has nonzero components $C_0$ through $C_3$.

Component $C_0$ is here considered to have unity amplitude. Similarly, multilevel input $B_2$ has an amplitude of three units, for example, and evokes the response 41 shown on line ($c$). Its main component $C_0'$ has a height of three units occurring in time with component $C_1$ on line ($b$). Zero height signals are assumed for the remaining clock times on line ($a$). The total response of the channel to signals $B_1$ and $B_2$ is shown on line ($d$). Components $C_0''$ through $C_4''$ are the summations of $C_0$, $(C_1+C_0')$, $(C_2+C_1')$ and so forth. The problem is to be able to separate components $C_0$ and $C_0'$ from the response on line ($d$).

In general, line ($d$) of FIG. 3 may be represented as a summation $$S_k=\sum_{=0}^{N} C_n B_{k-n} \quad (1)$$

$S_k$ is the signal appearing at the ouptut of channel 29 in FIG. 2 on line 33. In Equation 1 $k$ is an arbitrary integer representing the order of a particular symbol in the input data sequence; $n$ is an integer representing the order of the nonzero components of the channel impulse response to a single input at sampling instants, N is an integer representing the highest order nonzero impulse response component; C is an amplitude multiplier for the individual components; B is the channel input symbol; and S is the channel output symbol.

Equation 1 can be rewritten $$S_k=C_0B_n+\sum_{n=1}^{N}C_nB_{k-n} \quad (2)$$

Now the input $B_n$ can be separated out as $$B_n\frac{S_k-\sum_{n=1}^{N}C_nB_{k-n}}{C_0} \quad (3)$$

Equation 3 shows that a given input to channel 29 can be recovered from the output if $n$ previous inputs have been stored in the receiver. Any errors in any of the previous $n$ samples will appear in $n$ succeeding recovered signals. To avoid both the receiver storage and error propagation problems we can perform the subtraction indicated in Equation 3 before applying the input signal to the transmission channel. This is the function of precoding.

The precoder of broken-line block 11 of FIG. 2 is the inverse of the digital channel characteristic of block 29. Precoder 11 comprises a multitap delay line 25 with signal progression from right to left; a summer 27; multipliers 26 having the corresponding attenuation factors $C_0$ through $C_n$ of channel 29; and an input attenuator 24 whose factor is $1/C_0$. The output of precoder 11 on line 23 is subtracted modulo—M, where M is the number of discrete levels available to each input symbol $A_k$. If the output of precoder 11 on line 23 is subtracted modulo—M from the input symbol train $A_k$ on line 20 in adder 21, the output on line 22 is $C_0$ $B_k$, which can be found from Equation 3. Then $S_k=A_k$ (mod $M$). Effectively, the components $\Sigma$ $C_nB_{k-n}$ are subtracted out of input symbol train $A_k$ to obtain new train $B_k$ are restored in the channel to make $A_k=S_k$ (mod $M$). The original symbol train $A_k$ is recovered from received train $S_k$ by detection modulo—M in detector 34 in FIG. 2 and is available on output line 35.

Figure 4:
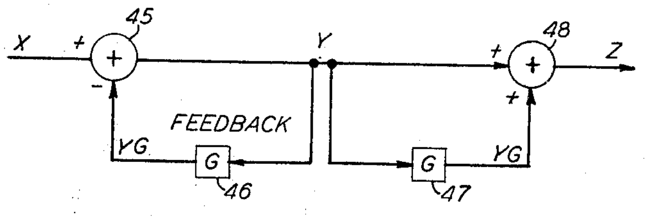
FIG. 4 is a block diagram of an analog of the precoding principle of this invention for purposes of clarity of explanation.

The precoding principle may be more clearly understood by the feedback-feedforward analog of FIG. 4. Here an arbitrary signal X at the input to an adder 45 has subtracted from it the feedback output Y multiplied by a factor G in block 46. Output Y may be represented as $$Y=X-YG \quad (4)$$

whence $$X=Y(1+G) \quad (5)$$

If the signal Y is transmitted over some link to a remote station having an adder 48, the signal X can be recovered from the output of Z adder 48 by multiplying the signal Y by the factor G in block 47 and feeding forward the signal YG to adder 48. The output Z of adder 48 becomes $$Z=Y+YG=Y(1+G) \quad (6)$$

It is clear that Equations 5 and 6 are identical and hence $Z=X$. The factor G is analogous both to the channel response and the precoder characteristic. This is the essence of the precoding principle.

Figure 5:
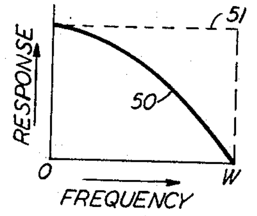
FIGS. 5 and 6 are respectively the frequency and time domain characteristics of a partial-response transmission channel spectrally shaped for a Class I response.
Figure 6:
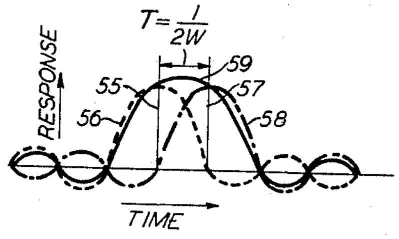

The precoding principle is made simpler to instrument if the $C_n$'s are readily predeterminable. This has been demonstrated by Kretzmer for the binary case. If a filter is added to the channel to produce the frequency response 50 of FIG. 5, the impulse response will be that of soild line 59 in FIG. 6. Rectangular response 51 (dashed line) is the ideal zero-rolloff Nyquist response over the frequency band W cycles wide and is shown for contrast. Response 50 has a cosine spectral shaping in the nonzero region. This shaping has the effect of adding the input signal to itself delayed by an interval $T=1/2W$. This is a Class I response as indicated in FIG. 6. Here sample 55 is the input signal having an impulse response 56 indicated by the dotted line. Its delayed replica is sample 57 having an impulse response 58 indicated by broken lines. The summation of responses 56 and 58 is Class I response 59 shown in solid outline. There are two nonzero samples 55 and 57 spaced $1/2W$ second apart. All other $1/2W$ sampling instants yield zero samples.

The Class I response may be described in terms of Equation 1 by using attenuation factors $C_0=C_1=1$. Thus, $$S_k=B_k+B_{k-1} \quad (7)$$

Since $S_k=A_k$ (mod $M$), the required precoding for a Class I signal (two-level or multilevel) becomes $$B_k=A_k-B_{k-1} \text{ (mod } M) \quad (8)$$

Figure 9:
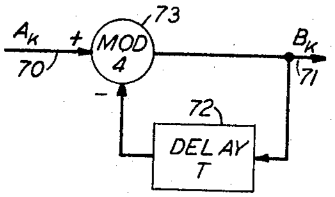
FIG. 9 is a simplified block diagram of a precoder according to this invention which matches a Class I partial-response transmission channel for four-level data inputs.

FIG. 9 shows precoder 11 of FIG. 2 simplified for Class I shaping of four-level data. The Class I precoder for a four-level signal comprises modulo-4 adder 73 with input symbols $A_k$ on line 70 and output symbols $B_k$ on line 71 and a feedback circuit to a subtracting input of adder 73 including delay unit 72 of one sampling interval.

Class I shaping is characterized by having a frequency cutoff at the upper band edge, and, in multichannel signaling systems, avoids crosstalk into adjacent channels. Many practical channels are incapable of transmitting a direct-current or zero-frequency component. For this type of channel Class IV spectral shaping is advantageous.

Figure 7:
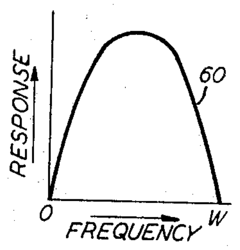
FIGS. 7 and 8 are respectively the frequency and time domain characteristics of a partial-response transmission channel spectrally shaped for a Class IV response.
Figure 8:
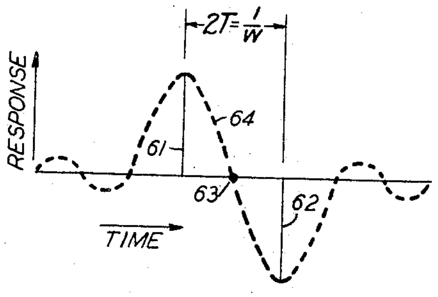

FIGS. 7 and 8 show respective frequency and impulse responses of a Class IV channel. Curve 60 in FIG. 7 has cutoffs at both upper and lower channel band edges. Therefore, there is neither direct-current transmission nor crosstalk into adjacent chanels of a multichannel transmission system. The overall shape is that of a half-cycle of a sine wave. The corresponding impulse response is a superposition of bipolar pulses 61 and 62 spaced by twice the signaling interval of $1/W$ second as shown in FIG. 8. The response envelope appears as broken-line curve 64 in FIG. 8. At all signaling intervals spaced at $T=1/2W$, other than the locations of samples 61 and 62, including center point 63, samples are zero.

The Class IV response may be described in terms of Equation 1 by taking attenuation factors $C_0=+1$, $C_1=0$ and $C_2=-1$. Thus, $$S_k=B_k-B_{k-2} \quad (9)$$

The corresponding precoding for a Class IV signal becomes $$B_k=A_k+B_{k-2} \text{ (mod } M) \quad (10)$$

Figure 10:
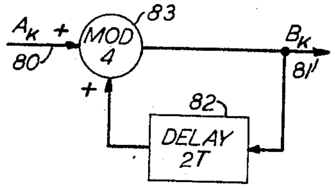
FIG. 10 is a simplified block diagram of a precoder according to this invention which matches a Class IV partial-response transmission channel for four-level data inputs.

FIG. 10 shows precoder 11 of FIG. 2 simplified for Class IV shaping and four-level data. The Class IV precoder comprises modulo-4 adder 83 with input symbols $A_k$ on line 70 and output $B_k$ on line 71 and a feedback circuit to an adding input of adder 83 including delay unit 82 of two sampling intervals.

Since $C_0$ in both Class I and IV precoders is unity, attenuator 24 shown in FIG. 2 is unnecessary.

Figures 11, 13:
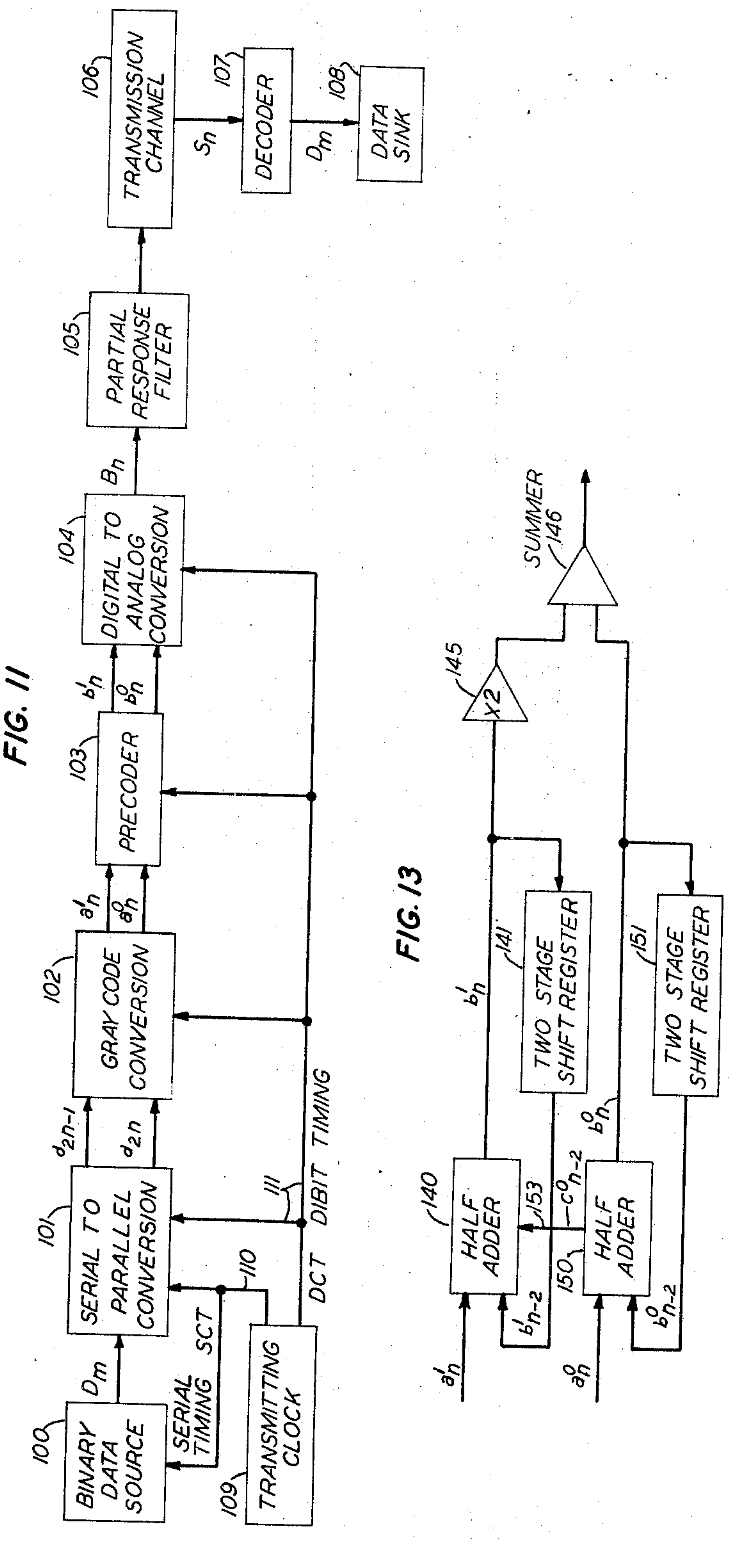
FIG. 11 is a block diagram of a practical multilevel, partial-response transmission channel according to this invention in which a binary signal train is precoded on a binary basis prior to multilevel conversion.

Delay units or shift registers capable of handling multilevel signals are cumbersome to implement. It has been found advantageous, therefore, to perform precoding and other operations in terms of binary logic before converting into multilevel format. Accordingly, a detailed block diagram for generating a multilevel, partial-response signal from a binary signaling train is shown in FIG. 11. Four-level signaling is assumed hereinafter for concreteness.

In FIG. 11 a serial binary signaling train $D_m$ from binary source 100 is first converted into two-bit parallel form. Each two-bit pair is hereinafter referred to as a dibit (pronounced dye-bit). Serial-to-parallel converter 101 is timed by the serial-clock timing (SCT) and dibit-clock timing (DCT) outputs of transmitting clock 109 on respective leads 110 and 111. The SCT output of clock 109 also synchronizes the serial data. Converter 101 may readily comprise the well-known J-K flip-flop.

Gray coding of the parallel data to ensure that a one-level error in detection of the received signal results in a single bit error is accomplished in block 102. The respective odd $d_{2n-1}$ and even $d_{2n}$ bits from converter 101 are applied to the input of Gray coder 102. Gray coding for a four-level system transposes the natural binary sequence 00, 01, 10, 11 to 00, 01, 11, 10, as is well known.

Hereinafter the most significant bit of a dibit pair is designated by the superscript "1" and the least significant by "0." Lower case letters indicate individual bits and upper case letters, multilevel combinations. Thus, the individual outputs of Gray coder 102 are designated $a_n^1$ for the most significant left-hand bit and $a_n^0$ for the right-hand bit. Similarly, $b_n^1$ and $b_n^0$ are the individual precoded bits and $B_n$ is the multilevel precoded symbol.

Precoder 103 accepts the Gray coded outputs $a^1_n$ and $a_n^0$ of block 102 and converts them according to the Class I or Class IV algorithm to precoded bits $b_n^1$ and $b_o^0$. Following precoding, precoded bits $b_n^1$ and $b_n^0$ are translated to multilevel format in digital-to-analog converter 104 to produce output $B_n$. Multilevel signal $B_n$ excites partial-response filter 105, which is tailored to transmission channel 106 to produce the appropriate Class I or Class IV shaping. The output $S_n$ of channel 106 is a seven-level ($2M-1$) signal for a four-level input. It is congruent modulo-4 with the four-level signal. At the receiver, therefore, decoder 107, by appropriate slicing, recovers the transmitted dibits, and data sink 108 makes the final conversion to the binary serial format. The receiving clock is not shown to avoid cluttering the drawing.

Gray coding of dibits is accomplished by transmitting the most significant bit $a_n^1$ as $b_n^1$ and the least significant as the modulo-two sum of the two input bits, i.e., $$b_n^1=a_n^1;\ b_n^0=a_n^1\oplus a_n^0 \qquad (11)$$

The circled plus sign indicates modulo-two summation. Modulo-two addition is, of course, the same effectively as modulo-two subtraction.

Figure 12:
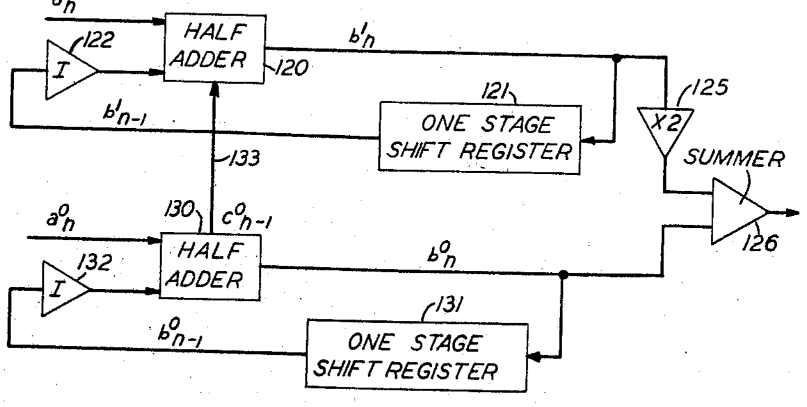
FIGS. 12 and 13 are block schematic diagrams of practical respective Class I and Class IV precoding and four-level conversion circuits for binary input signals in accordance with the principles of this invention.

Class I precoding in the binary format is advantageously accomplished for dibit inputs by using half-adders as shown in FIG. 12. The least significant digit $a_n^0$ is added in conventional half-adder 130 to its output $b_n^0$ fedback through a single-stage shift register 131 and inverter 132 as $(b_{n-1}^0)'$. Half-adder 130 performs modulo-two addition to produce output $b_n^0$. Inverter 132 keeps the sign of the carry correct. Thus, $$b_n^0=a_n^0\oplus b_{n-1}^0 \qquad (12)$$

The carry output on line 133 may be represented by the product $$b_{n-1}^0\cdot(a_n^0)'=c_{n-1}^0 \qquad (13)$$

The carry operation of Equation 13 is carried out internally in the half-adder in a conventional manner. Equation 13 indicates that a carry is generated only when $b_{n-1}^0$ is "1" and $a_n^0$ is zero.

The most significant digit $a_n^1$ is operated on in a similar manner in half-adder 120, one-stage shift register 121 and inverter 122. The algorithm for precoding the most significant digit is $$b_n^1=a_n^1\oplus b_{n-1}^1\oplus c_{n-1}^0 \qquad (14)$$

Outputs $b_n^1$ and $b_n^0$ are combined to form a four-level signal in multiplier 125 and summer 126 as shown in FIG. 12. The multilevel signal is $$B_n=b_n^0+2b_n^1 \qquad (15)$$

Class IV precoding is accomplished on a binary basis in a very similar manner using half adders as shown in FIG. 13. The least significant digit $a_n^0$ is combined in half-adder 150 with its output $b_n^0$ delayed by two-stage shift register 151 as follows:

$$b_n^0=a_n^0\oplus b_{n-2}^0 \qquad (16)$$

A carry is generated conveniently on line 153 as $$c_{n-2}^0=(a_n^0)'\cdot b_{n-2}^0 \qquad (17)$$

A most significant digit $a_n^1$ is operated on by half-adder 140 and two-stage shift register 141. The precoding is $$b_n^1=a_n^1\oplus b_{n-2}^1\oplus c_{n-2}^0 \qquad (18)$$

Multilevel conversion combines outputs $b_n^1$ and $b_n^0$ in multiplier 145 and summer 146 according to Equation 15.

For higher order multilevel signals the precoders of FIGS. 12 and 13 may be expanded appropriately by stacking additional half-adders in a straightforward manner.

Figure 14:
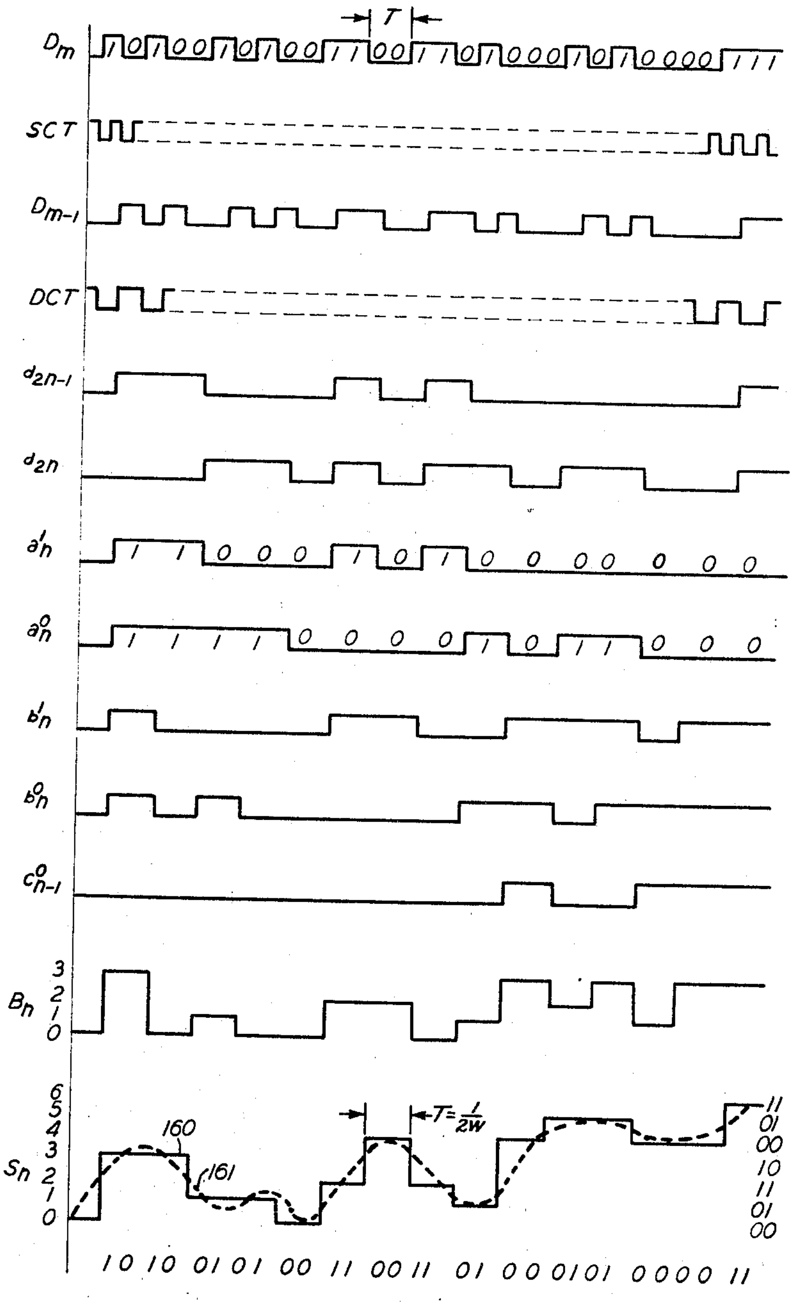
FIGS. 14 and 15 are waveform diagrams illustrating respective Class I and Class IV transformations of representative binary signal trains into precoded four-level, partial-response line signals effected in the system of FIG. 11.
Figure 15:
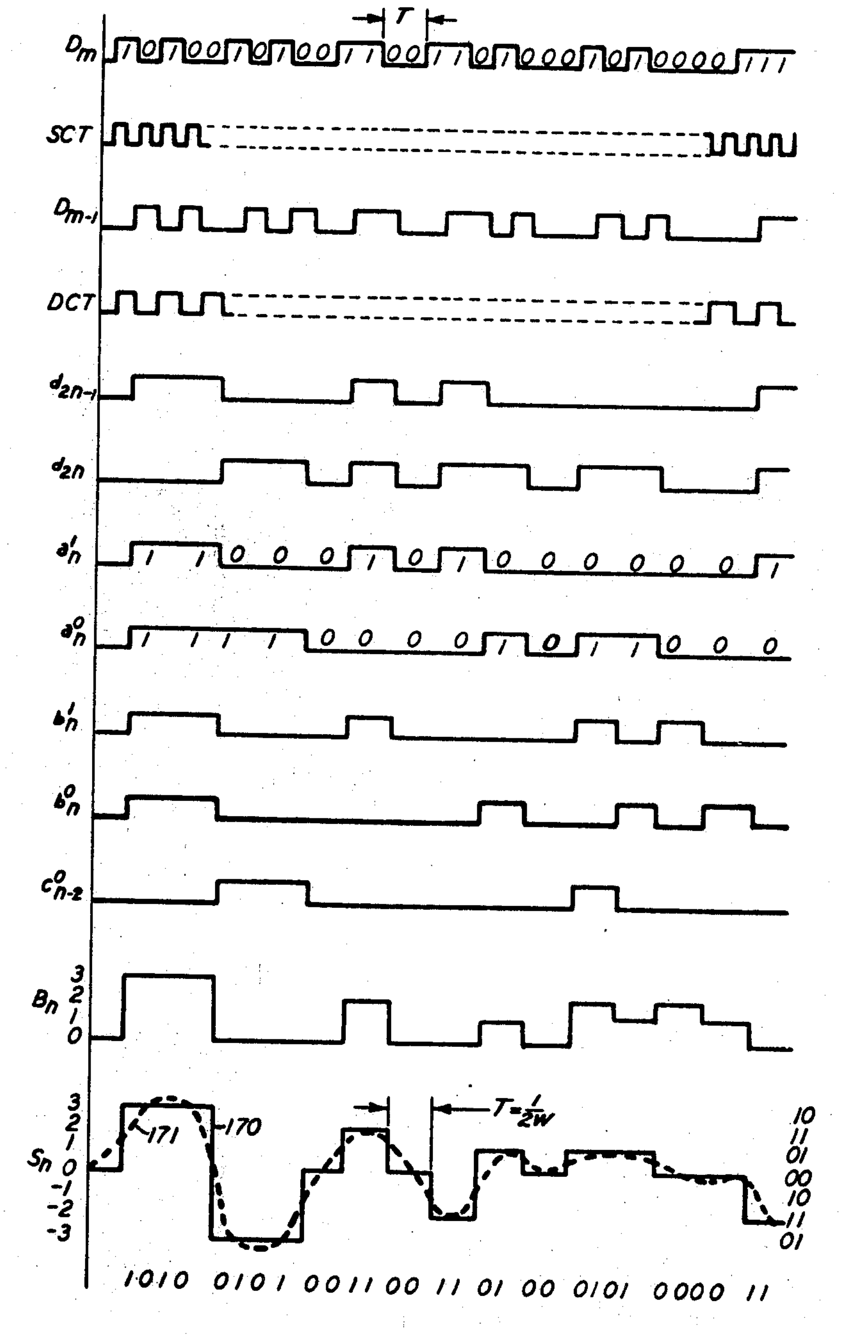

FIGS. 14 and 15 provide waveforms keyed to the block diagram of FIG. 11 for respective Class I and IV precoding. The following representative binary signal train $D_m$ is assumed in both figures:

101001010011001101000101000O0111

This train is shown (FIGS. 14 and 15) on lines $D_m$ in binary nonreturn-to-zero form. Time increases to the right. Lines SCT and DCT show the respective serial and dibit clock timing waves from clock 109. Lines $D_{m-1}$ are the same as lines $D_m$ with the wave shifted one serial-bit time to the right. Sampling of waves $D_m$ and $D_{m-1}$ with DCT timing yields lines $d_{2n-1}$ and $d_{2n}$. Lines $a_n^1$ and $a_n^0$ are the Gray coded conversions of lines $d_{2n-1}$ and $d_{2n}$ in accordance with Equations 11. Specifically, by way of example, the leftmost binary pair $D_m=10$ is therefore split first into dibit components $d_{2n-1}=1$ and $d_{2n}=0$ and then into Gray code format $a_n^1=1$, $a_n^0=1$ on the designated lines. FIGS. 14 and 15 are identical down to these lines.

Lines $b_n^0$, $c_{n-1}^0$ and $b_n^1$ in FIG. 14 are derived from lines $a_n^1$ and $a_n^0$ in accordance with Equations 12, 13, and 14 to obtain the equivalent Class I precoded wave. Specifically, the first pair is obtained as $$b_n^0=a_n^0\oplus b_{n-1}^0=1\oplus 0=1$$

and $$b_n^1=a_n^1\oplus b_{n-1}^1\oplus c_{n-1}^1=1\oplus 0\oplus 0=1$$

Precoded multilevel wave $B_n$ is derived from lines $b_n^1$ and $b_n^0$ according to Equation 15. Thus, the first symbol is found as $B_n=b_n^0+2b_n^1=1+2=3$. The four coding levels 0, 1, 2, and 3 are so designated. Finally, the received signal $S_n$ is derived from the excitation of the channel 106 and Class I filter 105 in accordance with the Class I algorithm of Equation 7. Thus, the first symbol becomes $$S_n=B_n+B_{n-1}=3+0=3$$

Solid curve 160 on line $S_n$ is the idealized received signal and broken-line curve 161 is the approximate smooth curve obtained in a practical channel. Line $S_n$ shows seven levels 0 through 6. In accordance with the equation $S_n=A_n(\text{mod } 4)$, line $S_n$ can be interpreted modulo-4 as indicated on the righthand legend. The bottom line verifies that the original serial data train can be derived from the seven levels of line $S_n$.

Lines $b_n^0$, $c_{n-2}^0$ and $b_n^1$ in FIG. 15 are derived from lines $a_n^1$ and $a_n^0$ in that figure in accordance with Equations 16, 17, and 18 to obtain the equivalent Class IV precoded wave. Precoded multilevel wave $B_n$ is derived from lines $b_n^1$ and $b_n^0$ according to Equation 15. Lines $B_n$ in both FIGS. 14 and 15 are four-level waves, but their structure is quite different because of the differences in the precoding algorithms. Line $S_n$ in FIG. 15 is formed from line $B_n$ in accordance with the Equation 9. Solid curve 170 on line $S_n$ is the idealized wave form and broken-line curve 171 is more like an actual wave transmitted over a real channel. Its seven levels are designated $-3$ through $+3$. Because Class IV shaping yields a bipolar signal the center level is the zero level. The several levels are interpreted modulo-4 in accordance with the legend to the right of line $S_n$. The original data train is verified on the bottom line of FIG. 15.

Although the waveforms of lines $S_n$ in FIGS. 14 and 15 are quite dissimilar they convey the same information, when interpreted according to the proper algorithm. They both achieve effective transmission rates of four bits per cycle of bandwidth using practical smooth channel shaping. A 2.4-decibel noise improvement over a conventional, i.e., without partial-response filtering, eight-level signaling system using a 50 percent raised-cosine rolloff spectrum is achieved with comparable or simpler equipment. Systems for partial-response transmission of multilevel signals with an arbitrary number of levels M can be implemented in accordance with the principles of this invention in a straightforward manner to achieve a signaling speed of 2 $\log_2$ M bits per cycle per second of bandwidth.

While this invention has been described in terms of specific illustrative embodiments, it will be understood to be susceptible of many modifications within the spirit and scope of its disclosed principle.

What is claimed is:

1. A system for transmitting multilevel data over a communication channel of limited frequency bandwidth comprising
   - means for precoding said multilevel input data by subtracting from present input signals the inverse of the impulse response of said channel derived from previous input signals,
   - means for exciting said channel with said precoded signals at a rate equal to twice the frequency bandwidth of said channel to produce superimposed multilevel channel signals, and
   - means for reconstructing said input multilevel signals from single samples of said channel signals.

2. A system for transmitting M-level data symbols over a communication channel of limited frequency bandwidth W at an effective binary signaling rate of 2 $\log_2$ M bits per cycle of bandwidth where M is greater than two comprising
   - means for precoding said M-level input data by subtracting from present input signals the inverse of the impulse response of said channel derived from previous input signals,
   - means for exciting said channel with said precoded signals at the rate 2W to produce $(2M-1)$-level channel signals, and
   - means reconstructing said M-level input signals from a modulo-M interpretation of single samples of said channel signals.

3. A system for transmitting M-level data symbols over a communication channel of limited frequency bandwidth W whose impulse response is digitally represented as $$\sum_{n=0}^{N} C_n B_{k-n}$$

where $C_n$=the amplitude of the $n$ ($n$ greater than one) nonzero time-spaced samples at intervals $T=1/2W$ second of such impulse response to a unit impulse and $B_k$=the amplitude of the $k$th symbol in an input data train at a transmission rate of 2W symbols per second, comprising
   - precoding means for subtracting from input data symbols the summation of previous input symbols $$\sum_{n=1}^{N} C_n B_{k-n}$$

and for attenuating the results of such subtraction by the factor $1/C_0$, when $C_0$=the amplitude of the first significant sample of the unit impulse response of said channel,
   - means for applying said precoded signal to said communication channel at the rate 2W to form a multilevel output signal which is congruent modulo-M with said input signals, and
   - means for reconstructing said M-level data symbols from single samples of said output signal spaced at intervals $T=1/2W$ second.

4. A system for transmitting digital data signals over a communication channel at transmission rates exceeding twice the frequency bandwidth of the cannnel comprising
   - a serial binary data source,
   - means for converting successive bits from said source into parallel form in blocks of two or more,
   - means for precoding the parallel blocks into a form equivalent to the difference between the applied block and the channel-matched filter representation of previous precoded blocks,
   - means for converting said precoded blocks into multilevel signals having sufficient levels to encode each possible permutation of said precoded blocks,
   - means for applying said multilevel signals to said communication channel at a rate equal to twice said frequency bandwidth to form superimposed multilevel signals,
   - means for recovering unprecoded parallel blocks from single samples of said superimposed multilevel signals, and
   - a data sink for reconstructing binary signals from the samples taken by said recovering means.

5. The system of claim 4 in which the successive data bits from said data source are converted into two-bit parallel dibits,
   - said communication channel has an impulse-response digitally equivalent to adding each input symbol to itself delayed by one signaling interval,
   - said precoding means continuously subtracts modulo-four fashion from its present input its next previous output to form its present output,
   - said multilevel conversion means adds the least significant bit of each precoded bibit to twice the most significant bit, and
   - said recovering means interprets the successive levels of the superimposed multilevel signals modulo-four fashion.

6. The system of claim 4 in which the successive data bits from said data source are converted into two-bit parallel dibits,
   - said communication channel has an impulse-response digitally equivalent to subtracting each input symbol from itself delayed by two signaling intervals,
   - said precoding means continuously adds modulo-four fashion to its present input its previous output delayed by two signaling intervals to form its present output,
   - said multilevel conversion means adds the least significant bit of each precoded dibit to twice the most significant bit, and
   - said recovering means interprets successive levels of the superimposed multilevel signals modulo-four fashion.

7. In combination with a serial binary data source, a communication channel having a bandwidth W, and a binary data sink, the improvement comprising
   - a channel filter for spectrally shaping said channel such that the complete response to a single impulse is equivalent to the superposition of this impulse and one or more other delayed impulses,
   - means for converting binary data from said source into parallel dibits,
   - means for converting said dibits into Gray-code cyclic pairs,
   - means for precoding said Gray-code pairs by subtracting from present pairs the channel-matching impulse-response of previous pairs to obtain precoded pairs,
   - first means for superimposing precoded pairs to form a first multilevel output, means for exciting said channel filter with said first multilevel output at the rate 2W to form a second multilevel line signal, means for decoding said line signal by modulo-four interpretation of the several levels thereof, and means for connecting said decoding means to said data sink.

8. The method of converting a binary data signal train into a multilevel precoded format to achieve an effective binary signaling rate through a communication channel of limited-frequency bandwidth exceeding two bits per cycle of bandwidth comprising the steps of performing a serial-to-parallel conversion of equal-length groups of serial data bits, transposing said equal-length groups into cyclic code format, precoding said cyclic-coded parallel groups such that the channel impulse response is compensated digitally in advance of transmission, forming a first multilevel signal from each of said precoded groups, applying said first multilevel signal to said communication channel at the rate equal to twice the frequency bandwidth of said channel to form a second multilevel signal, and reconstructing said groups of serial data bits from independent samples of said second multilevel signal.

References Cited

UNITED STATES PATENTS

| | | | |
|---|---|---|---|
| 3,139,615 | 6/1964 | Aaron | 340—347 |
| 3,317,720 | 5/1967 | Lender | 325—38 |
| 3,354,267 | 11/1967 | Crater | 325—38 |
| 3,409,875 | 11/1968 | Jager et al. | 325—41 XR |
| 3,421,146 | 1/1969 | Zegers et al. | 325—38 |
| 3,419,805 | 12/1968 | Melas | 325—38 |

OTHER REFERENCES

An RZI Coding and Implementation, E. Hopner and W. J. Johnson, Jr., IBM Technical Disclosure Bulletin, vol. 6, No. 9, February 1964.

JOHN W. CALDWELL, Primary Examiner

C. R. VONHELLENS, Assistant Examiner

U.S. Cl. X.R.

325—2; 340—146